(12) United States Patent
Yu et al.

(10) Patent No.: US 9,829,591 B1
(45) Date of Patent: Nov. 28, 2017

(54) DETERMINING SEISMIC STRATIGRAPHIC FEATURES USING A SYMMETRY ATTRIBUTE

(71) Applicant: IHS Global Inc., Englewood, CO (US)

(72) Inventors: Yingwei Yu, Katy, TX (US); Clifford L. Kelley, Sugar Land, TX (US); Irina M. Mardanova, Houston, TX (US)

(73) Assignee: IHS Global, Inc., Englewood, CO (US)

( * ) Notice: Subject to any disclaimer, the term of this patent is extended or adjusted under 35 U.S.C. 154(b) by 661 days.

(21) Appl. No.: 13/735,926

(22) Filed: Jan. 7, 2013

(51) Int. Cl.
  *G01V 1/00* (2006.01)
  *G01V 1/30* (2006.01)
  *G01V 1/28* (2006.01)
  *G01V 1/34* (2006.01)
  *G01V 1/36* (2006.01)

(52) U.S. Cl.
  CPC .............. *G01V 1/301* (2013.01); *G01V 1/288* (2013.01); *G01V 1/34* (2013.01); *G01V 1/364* (2013.01); *G01V 2210/63* (2013.01)

(58) Field of Classification Search
  CPC .......... G01V 1/288; G01V 1/301; G01V 1/32; G01V 1/34; G01V 2210/322; G01V 1/364
  See application file for complete search history.

(56) References Cited

U.S. PATENT DOCUMENTS

| | | |
|---|---|---|
| 4,207,619 A | 6/1980 | Klaveness |
| 4,213,194 A | 7/1980 | Spurlock et al. |
| 4,803,668 A | 2/1989 | Berryhill et al. |
| 5,535,286 A * | 7/1996 | Ibbotson et al. ........ G06T 7/608 |
| | | 348/85 |
| 5,892,732 A | 4/1999 | Gersztenkorn |
| 5,940,778 A * | 8/1999 | Marfurt et al. .................. 702/16 |
| 6,151,555 A * | 11/2000 | Van Bemmel et al. ........ 702/14 |
| 6,988,038 B2 | 1/2006 | Trappe et al. |
| 7,474,996 B2 | 1/2009 | Horne et al. |
| 7,679,993 B2 | 3/2010 | Sayers |
| 7,830,748 B2 | 11/2010 | Guigne et al. |
| 8,072,841 B2 | 12/2011 | Chang et al. |
| 8,205,711 B2 | 6/2012 | Hopperstad et al. |
| 8,233,350 B2 | 7/2012 | Lambert et al. |
| 2004/0210394 A1 * | 10/2004 | Trappe .................... G06F 17/18 |
| | | 702/14 |
| 2008/0130407 A1 * | 6/2008 | Akhtar .............................. 367/9 |
| 2008/0170468 A1 * | 7/2008 | Brain ....................... G01V 1/30 |
| | | 367/38 |
| 2008/0212841 A1 * | 9/2008 | Gauthier et al. .............. 382/109 |
| 2008/0304359 A1 * | 12/2008 | Ferber .................... G01V 1/366 |
| | | 367/52 |
| 2010/0036614 A1 | 2/2010 | Zuercher |
| 2011/0272161 A1 * | 11/2011 | Kumaran et al. ............. 166/369 |
| 2013/0100770 A1 * | 4/2013 | Diller .................... G01V 1/288 |
| | | 367/38 |

* cited by examiner

*Primary Examiner* — John Breene
*Assistant Examiner* — Mohammad Islam
(74) *Attorney, Agent, or Firm* — Faegre Baker Daniels LLP

(57) ABSTRACT

A symmetry attribute is described that may be used for determining seismic stratigraphic features in a formation. In one example, seismic input data from a formation is processed to determine an attribute by selecting a center trace, assigning a first cluster of the traces to a left image and a second cluster of the traces to a right image, and determining symmetry about the center trace between the left and the right images.

19 Claims, 8 Drawing Sheets

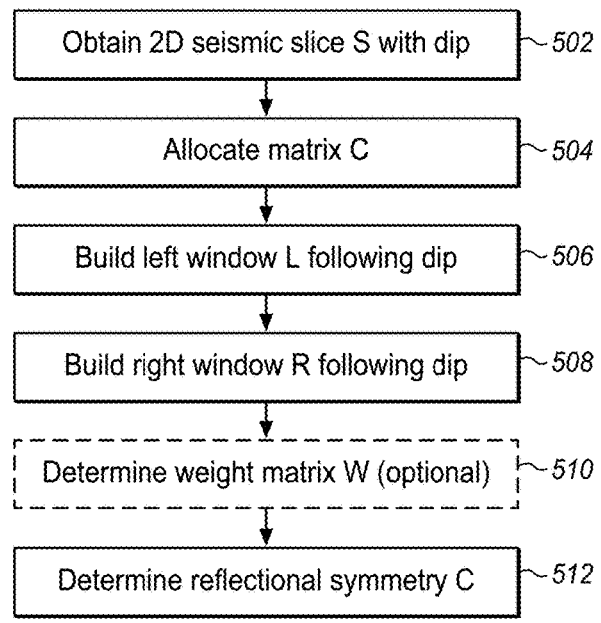
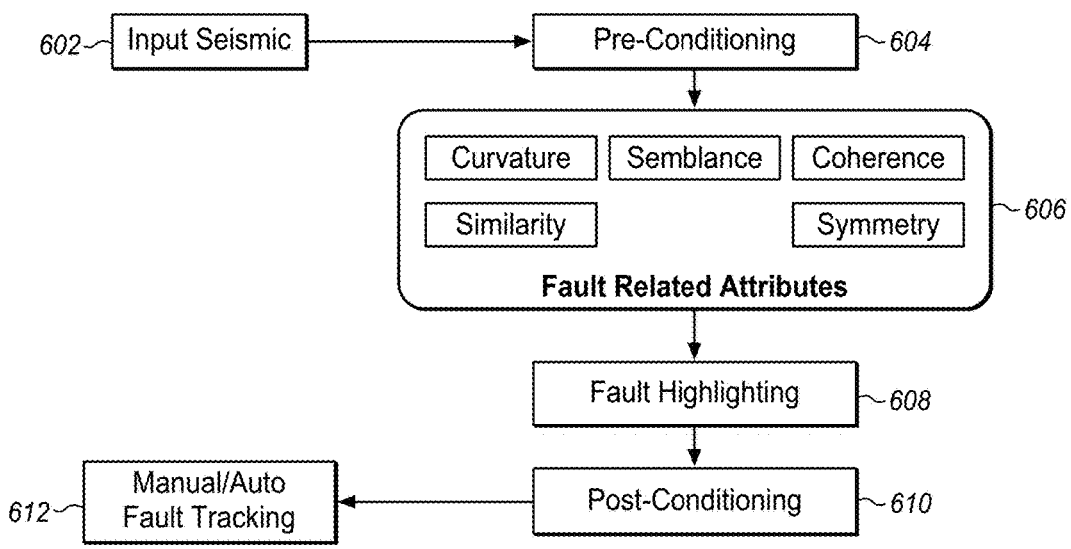

DETERMINING SEISMIC STRATIGRAPHIC FEATURES USING A SYMMETRY ATTRIBUTE

FIELD

The present description relates to determining attributes of seismic traces from reflection surveys and, in particular, to determining symmetry of seismic traces.

BACKGROUND

The oil & gas industry regularly employs seismic reflection surveys to image the earth's subsurface, looking for geologic structures and environments capable of generating, migrating, and trapping commercial hydrocarbon deposits. Geoscientists use two dimensional (2D) and three dimensional (3D) seismic sections and volumes to more fully define geologic structural and stratigraphic features commonly associated with hydrocarbon discoveries, such as subsurface faults, unconformities, channels, and submarine fans. The slices and volumes are built from reflection survey data collected from a section or volume of the subsurface. Today, 3D seismic is increasingly being employed to detect and map natural fracture systems that can greatly influence the effective permeability of producing reservoirs, thereby affecting the overall economics of developing oil & gas fields.

Seismic reflection surveys are performed using sensors placed on land, in the sea, and on the sea floor. Received reflections are noise-filtered and the data are otherwise conditioned for interpretation. A typical record of seismic echoes as detected by a single receiver at the surface is a trace in the shape of a sinusoidal curve as a function of time. Seismic echoes oscillate between compression and rarefaction over a period of several seconds, and this rise and fall in pressure with time is recorded for processing and analysis. The amplitude generally reflects the nature of the formation, while the time generally reflects the depth below the receiver. A seismic trace may be subject to multipath, interference, echoes and other effects that reduce the accuracy of the trace. As a result the traces are filtered, conditioned, and interpreted. An interpreter may have several thousand or several million traces to interpret in a single survey.

One element of interpreting subsurface rock and fluid characteristics as well as the presence of faults and channels is the analysis of properties of the recorded seismic waveforms known as seismic attributes. Various attributes may be determined in a variety of different ways from elements of the seismic waves themselves, such as amplitude, phase, frequency, and attenuation. There are also attributes associated with the differences in adjacent recorded waveforms such as similarity or semblance, discontinuity, and attenuation. These latter attributes are more typically used to identify changes from one recorded signal to another. As a result they reveal subtle structural and stratigraphic features within a 2D slice or 3D seismic volume such as faults, fractures, channels, and salt domes.

BRIEF DESCRIPTION OF THE DRAWING FIGURES

Embodiments of the invention are illustrated by way of example, and not by way of limitation, in the figures of the accompanying drawings in which like reference numerals refer to similar elements.

FIG. 5 is a process flow diagram of determining reflectional symmetry about a central trace of a 2D seismic slice with dips according to an embodiment of the invention.

FIG. 6 is a functional block diagram of finding faults and other features of a seismic slice or volume using symmetry attributes according to an embodiment of the invention.

DETAILED DESCRIPTION

An enhanced 3D seismic attribute may be determined based on the calculation of reflectional and rotational symmetry values. Symmetry is a new type of seismic volumetric attribute, which is sensitive to the seismic amplitude variations, and therefore strongly correlates with discontinuities and curvatures associated with imaged geologic surfaces. The rotational symmetry attribute can be used as a tool to identify faults, fractures, channels, and other stratigraphic features.

The reflectional and rotational symmetry data provides a high quality seismic attribute suitable for fault picking. Compared with other existing attribute calculation techniques, such as correlation-based, semblance-based, variance-based, eigenstructure-based, gradient structure tensor (GST)-based, and least-square-based, a symmetry attribute calculation more effectively shows subtle local symmetry variations in a circular pattern of adjacent seismic waveforms. This provides higher resolution imaging of many subtle stratigraphic features, which may be missed using other types of attribute analysis.

Symmetry is a fundamental attribute in human visual perception, and in many natural structures. As described herein, a symmetry analysis may be used as a seismic attribute to measure the degree of chaotics in seismic data.

Reflection values in 2D seismic images and rotational symmetry values in 3D seismic volumes may be used to analyze symmetry. The symmetry may be used as a type of seismic volumetric attribute, which is sensitive to the seismic amplitude variations, and therefore strongly correlates with discontinuities and curvatures associated with imaged geologic surfaces. The rotational symmetry attribute can be used as a tool to identify faults, fractures, channels, and other stratigraphic features.

An attribute based on the symmetry data may be used to provide a high quality seismic attribute suitable for fault picking. The symmetry data provides a view into the subtle local symmetry variations in circular patterns of adjacent seismic waveforms. Therefore, the resulting attribute provides higher resolution imaging of many subtle stratigraphic features, than are typically obtained.

Figure 1:
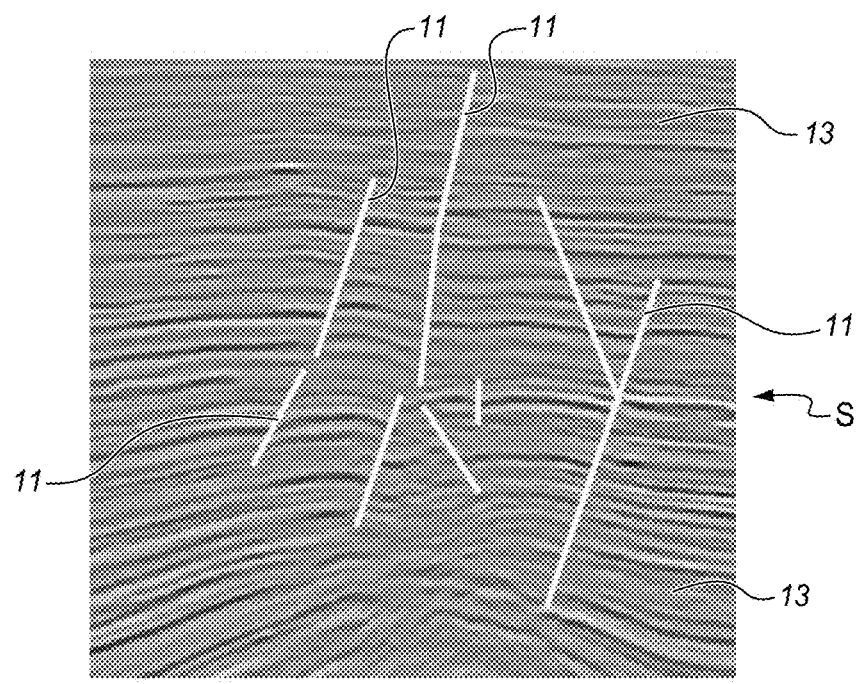
FIG. 1 is a diagram of a vertical seismic slice developed from seismic input data showing faults.

In geosciences, a fault is a planar pattern caused by rock displacement. FIG. 1 is a diagram of a vertical seismic slice S developed from seismic data of a natural underground formation. The slice shows an example of several faults 11 in the linear patterns 13 of this diagram of a planar section. While the faults are easy to perceive by human observation, they are very difficult to detect using mathematical analysis.

From an image analysis perspective, the seismic data in general presents a symmetric pattern locally. The movement of the rock results in the displacement of seismic image patches, and therefore, the image presents local asymmetric patterns in the fault region. The level of coherence can therefore be related to a local symmetry analysis in the seismic image. The seismic symmetry attribute can be used as an attribute for fault tracking algorithms. Symmetry may be directly derived from seismic amplitude data.

Figure 2:
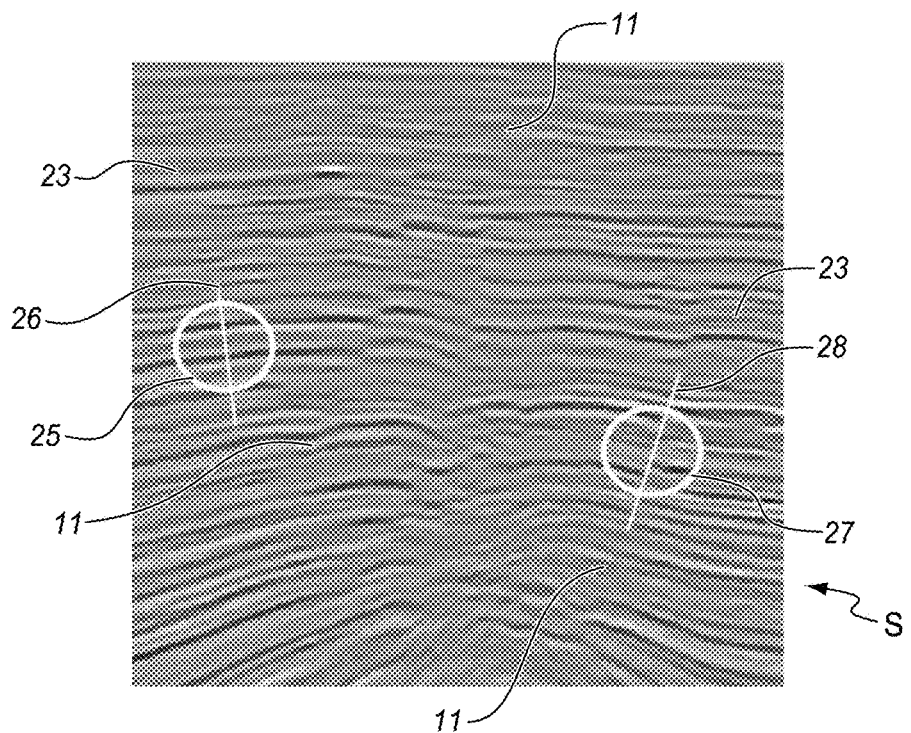
FIG. 2 is a diagram of a seismic slice developed from seismic input data showing faults and dips.

FIG. 2 is a diagram of the same seismic slice S as in FIG. 1 that includes several faults 11 in the linear patterns 23 of the slice. The faults can be perceived using the human eye after this representation has been formed. Consider two image patches, one in a first left side circle 25, the other in a second right side circle 27. In the first circle, the seismic image patch is symmetric along an axis perpendicular to the dip. The circle includes a line 26 that is the symmetric axis. The linear patterns within the first circle demonstrate a mirror symmetry about the line. In the second right side circle, due to the rock movement, there is a similar line 28, but the seismic pattern is not symmetric about this line, which may indicate a low coherent region, for example a fault.

Local symmetry may be used as a seismic attribute for both a 2D seismic image and a 3D seismic volume. The 2D symmetry is the local reflectional symmetry, while the 3D symmetry is rotational symmetry. Symmetry as an attribute effectively illustrates subtle and complex stratigraphic patterns, which are often omitted by other coherence attributes. Symmetry may be used as an essential attribute for fault auto-picking.

Figure 3:
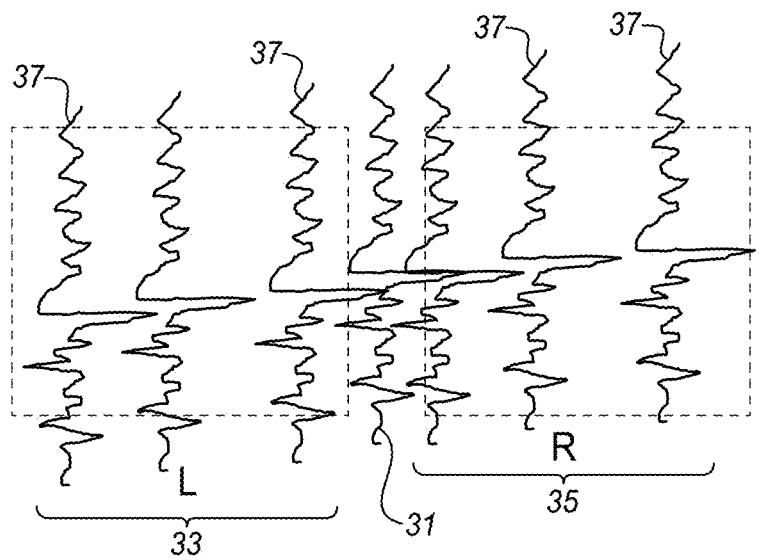
FIG. 3 is a diagram of a sequence of seismic traces on the left and right of a center trace identified for reflectional symmetry according to an embodiment of the invention.

A degree of symmetry in an image, such as a seismic slice can be mathematically approximated. By determining the degree of symmetry in many areas of the slice, the faults can be found. In order to simplify the approximation, local dips can be ignored. This is equivalent to not checking for a local dip, or assuming or approximating the local dip as zero. FIG. 3 is a diagram of a series of adjacent seismic traces 37. Each trace shows seismic data vertically over time at different locations horizontally along the surface of a geographical region. A central trace 31 is selected for purposes of calculating symmetry. To the left of the central trace 31 is a left-side image patch L 33, and to the right of the central trace, is a right-side image patch R 35. The left and right designations are made for purposes of calculating symmetry about a line or about a central trace 31 between the left and right patches. In order to fully characterize the sequence of traces, the symmetry determinations may be repeated with each of the traces of the sequence selected as the central trace. The left and right matrices will shift as the central trace is shifted through the sequence.

Image patches L and R can each be represented by a 2D matrix, L and R, respectively. In order to directly compare the right-side matrix R to the left-side matrix L, the R matrix is populated in reverse order from L. The degree of the reflectional symmetry can be evaluated as provided in Equation 1:

$$s = \exp\left(\frac{\sum |L - R|}{\sigma \sum |L| + |R|}\right)^2 \qquad \text{Eq. 1}$$

where s is the degree of reflectional symmetry and σ is a constant. The particular choice for σ may depend on the particular implementation and may be adjusted to provide the best results in a particular type of formation. In one example σ is set equal to 1.0.

In another embodiment, equation 1 may be modified by adding a weight matrix W to improve the contrast as shown in equation 2:

$$s = \exp\left(\frac{\sum |L - R| \cdot W}{\sigma \sum |L| + |R|}\right)^2 \qquad \text{Eq. 2}$$

where the weight matrix W may be determined in any of variety of different ways. While the illustrated weight matrix improves contrast in many implementations, for other formations and other types of traces, a different weight matrix may be preferred. In one embodiment the weight matrix is determined as shown in equation 3. In this example, the values in matrix W are dependent on the signs of values in matrices L and R. The relationship provided by Equation 3 is provided below in Table 1.

$$W = \left[\frac{3 - \text{sign}(L) * \text{sign}(R)}{2}\right] \qquad \text{Eq. 3}$$

TABLE 1

| Sign of L | Sign of R | Value in W |
|---|---|---|
| + | + | 1 |
| − | − | 1 |
| + | − | 2 |
| − | + | 2 |
| 0 |   | 1.5 |
|   | 0 | 1.5 |

Figure 4:
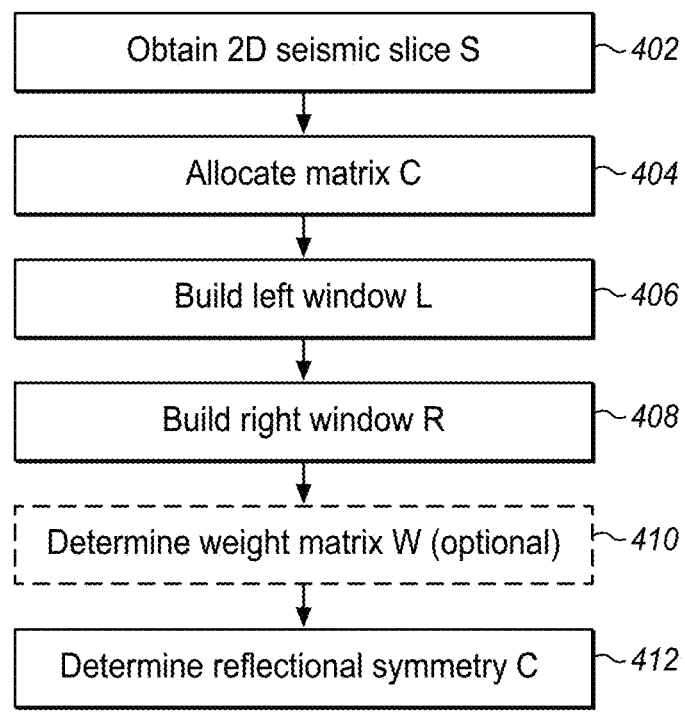
FIG. 4 is a process flow diagram of determining reflectional symmetry about a central trace of a 2D seismic slice according to an embodiment of the invention.

One technique for obtaining the reflectional symmetry of a set of seismic traces about a selected center trace may be considered as a process as described herein and shown in the process flow diagram of FIG. 4. At 402 a two-dimensional seismic slice S is obtained as diagrammed for example in FIG. 3. For purposes of this description, C is the symmetry in the form of a matrix, $w_h$ is the horizontal window size and $w_v$ is the vertical window size.

At 404 a matrix C is allocated with the same size as the matrix of the seismic slice S. Size, in this case, means that the matrix has the same number of rows and columns. At 406, the left window is built and at 408, the left window is built. This can be done using the matrix S. It begins by selecting a central trace for this particular symmetry determination. The central trace defines left and right as being some number of traces on either side of the central trace. Each pixel in S can be defined with an index (i, j). Matrix L, for the left window, can be built at 406 by a command such as GetWindow(S, i, j, $w_h$, $w_v$, −1), where the window is defined by parameters S(i, j), $w_h$, $w_v$, and −1 indicate that this matrix is for the left traces. Similarly, matrix R, for the right window, can be built at 408 by a command such as GetWindow(S, i, j, $w_h$, $w_v$, 1) where 1 indicates that the matrix is for the right traces. −1, 1 indicate a direction where 0 indicates a center or no direction and the values −1, +1 may be generalized to accommodate additional dimensions.

Using the obtained windows R and L, the weighting matrix W may optionally be determined at 410 as provided, for example, using Eq. 3. The weight matrix can then be optionally applied as in Eq. 2 to the R and L matrices and at 412 the reflectional symmetry C is determined. This process flow is repeated for each new location or trace that is to be designated as a center or central trace for reflectional symmetry determinations.

Considering the building of the two matrices L and R, this may be done by collecting the vertical data as i, in the range from i−$w_v$ to i+$w_v$. the horizontal data of the matrix for j is collected from j−$w_h$ to j+$w_h$. This is done on both the right (−1) and the left (+1) side of the central trace.

The processes of FIG. 4 may be shown in pseudo code in one example. In the example below d is used to indicate the direction from the central trace (0) as either left (−1) or right (+1) and return indicates that the retrieved values are stored in a register or memory or conveyed to another process. The example pseudo code is as follows:

---

Pseudo code example 1: 2D Symmetry without Dip
1: procedure SYMMETRY2D(S,$w_h$, $w_v$)    S: 2D vertical seismic slice, $w_h$,$w_v$:horizontal and vertical window sizes
2:    C←Allocate matrix with same size as S
3:    for each pixel in S with index (i; j) do
4:        L ←GetWindow(S, i, j, $w_h$, $w_v$, −1)    Get the left window
5:        R ←GetWindow(S, i, j, $w_h$, $w_v$, +1)    Get the right window
6:        $$W \leftarrow \left[\frac{3 - \text{sign}(L) * \text{sign}(R)}{2}\right]$$
7:        $$C(i, j) \leftarrow \exp\left(\frac{\sum |L - R| \cdot W}{\sigma \sum |L| + |R|}\right)^2$$
8:    end for
9:    return C

---

10: end procedure
11: procedure GETWINDOW(S, i, j, $w_h$, $w_v$, d)
12:    Allocate an empty matrix L
13:    if d≤ 0 then
14:        L ←S(i−$w_v$ : i+$w_v$, j−$w_h$ : j−1)    Get the left window
15:    else
16:        R ←S(i−$w_v$ : i+$w_v$, J+1:j+$w_h$)    Get the right window
17:    end if
18:    return L
19: end procedure

---

In some circumstances, the seismic patterns may have a dip. An example is shown in FIG. 2 by comparing the right side circle 25 of FIG. 2 which has no dip to the left side circle 27 which has a dip. The accuracy of the reflection determinations are enhanced by taking the dips into consideration in the symmetry calculation. In one embodiment, this can be done by simply adjusting the left and right matrices L and R to follow the dip. A pre-calculated dip may be used to assemble the L and R matrices, and calculate the degree of symmetry in the same way as described above. There are a variety of different ways to pre-calculate the dip.

FIG. 5 is a process flow diagram of determining a two-dimensional reflectional symmetry and accommodating a dip in the formations. At 502 a 2D seismic slice S with an apparent dip θ is obtained with horizontal $w_h$ and vertical $w_v$ window sizes. The value or values θ used to represent the dip may be obtained in any of a variety of different ways, depending on the particular implementation. One useful way to determine the dip is described in U.S. Pat. No. 8,265,876, the disclosure of which is hereby incorporated by reference in its entirety herein.

At 504 a matrix C is allocated for the reflectional symmetry with the same size as the seismic slice S. At 506, the left window matrix is built and at 508, the right window matrix is built. Again a central or center trace (0) is first selected and then L and R are built with reference to the center. This can be done using the slice matrix S. Each pixel in S can be defined with an index (i, j). Matrix L, for the left window, can be built at 506 by a command such as GetWindowbyDip(S,θ,i,j,$w_h$,$w_v$,−1). Similarly, matrix R, for the right window, can be built at 408 by a command such as GetWindowbyDip(S,θ,i,j,wh,wv,1). The left and right windows may be obtained in part by following the dip.

Using the obtained windows R and L, the weighting matrix W can be determined at 510 as provided, for example, using Eq. 3. The weight matrix may then be optionally applied as in Eq. 2. At 512 the reflectional symmetry C is determined. This process flow is repeated for each new location that is to be designated as a center for reflectional symmetry determination.

The processes of FIG. 5 may be shown in pseudo code in one example similar to that of the example of FIG. 4.

---

Pseudo code example 2: 2D Symmetry with Dip
1: procedure SYMMETRY2DDIP(S, θ, $w_h$, $w_v$)    S is the 2D vertical seismic slice, θ is the apparent dip, $w_h$;$w_v$ are the horizontal and vertical window sizes
2:    C←Allocate matrix with same size as S
3:    for each pixel p in S with index (i, j) do
4:        L ←GetWindowByDip(S, θ, i, j, $w_h$, $w_v$, −1)    Get the left window
5:        R ←GetWindowByDip(S, θ, i, j, $w_h$, $w_v$, +1)    Get the right window
6:        $$W \leftarrow \left[\frac{3 - \text{sign}(L) * \text{sign}(R)}{2}\right]$$
7:        $$C(i, j) \leftarrow \exp\left(\frac{\sum |L - R| \cdot W}{\sigma \sum |L| + |R|}\right)^2$$

```
 8:      end for
 9:      return C
10: end procedure
11: procedure GETWINDOWByDip(S, θ, i, j, w_h, w_v, d)
12:      Allocate an empty matrix L
13:      if d≤ 0 then
14:            L ←TheLeftWindowbyFollowingtheDip
15:      else
16:            R ←TheRightWindowbyFollowingtheDip
17:      end if
18:      return L
19: end procedure
```

The reflectional symmetry above or the rotational symmetry described below may be used as an attribute for characterizing a formation. The symmetry attributes may be applied to many different purposes and may be combined with many other attributes. One use for symmetry and other attributes is to find or pick polylines or faults from input seismic data. FIG. 6 shows an example process flow for this use. In this case, the symmetry of a set of seismic traces is combined with other fault related attributes.

In the example workflow of FIG. 6, input seismic data is received 602. The input seismic data is usually amplitude data in a 3D volume. This seismic data may then be pre-conditioned 604. Pre-conditioning includes noise reduction which can be conducted, for example, through a median filter or a band-pass filter. The pre-conditioning, or alternatively, noise reduction is an initial operation to clean the input data. This may be done with a simple median filter. For 3D seismic data, a 3D median filter may be employed. A median filter may in many instances significantly improve the quality of the fault attribute.

Some fault or fracture features may only be clearly seen within a certain bandwidth. In such a case, a band-pass filter is an alternative to a median filter for pre-conditioning the seismic data. Different bandwidths illustrate different fault or fracture patterns. A spectrum decomposition may in such a case be used as a pre-conditioning step.

The smoothed amplitude data may then be used to generate fault related attributes 606, such as semblance, coherence, similarity, among others, or symmetry as described above. There are a variety of different attributes that may be determined in different ways. Reflectional and rotational symmetry may be determined as described herein, for example.

The fault attribute may then be exposed to an enhancement operation 608. The fault enhancement may be used to take a fault attribute as input, such as coherence or symmetry and then highlight it or enhance it so that a fault or other characteristic of the formation may be more easily detected and discovered. As an example, the enhanced fault attributes may have smoother and cleaner curves, lines, or planes and sharper contrast. A further post-conditioning operation 610 may be applied to the fault enhanced volume to suppress unwanted features.

The enhanced faults or faults without enhancement may be applied to a process that picks out the faults 612 either manually or automatically so that the faults may be identified. A geologist may analyze imagery to find faults or a fault tracking algorithm may be used to select possible faults for review or analysis. As an alternative to picking faults, the symmetry attribute may be used for fracture tracking, for detecting channels beside faults and fractures, for finding non-conformities, and for data enhancement operations. The symmetry attribute may be used, for example, in various noise reduction processes such as edge-preserving smoothing.

Picking the faults may depend upon the developed fault attributes to show the fault patterns. The local symmetry fault attribute measures the reflectional symmetry in a 2D seismic image, or rotational symmetry in a 3D seismic volume. The local symmetry illustrates the fault patterns as straight lines.

For 3D seismic data, there are many ways to calculate the symmetry attribute volume. For example, a symmetry, slice by slice, can be obtained in both inline and cross-line directions. The results may be blended together into one single volume. This may be provided as one of the attributes or the only attribute in the same workflow of FIG. 6.

Figure 7A:
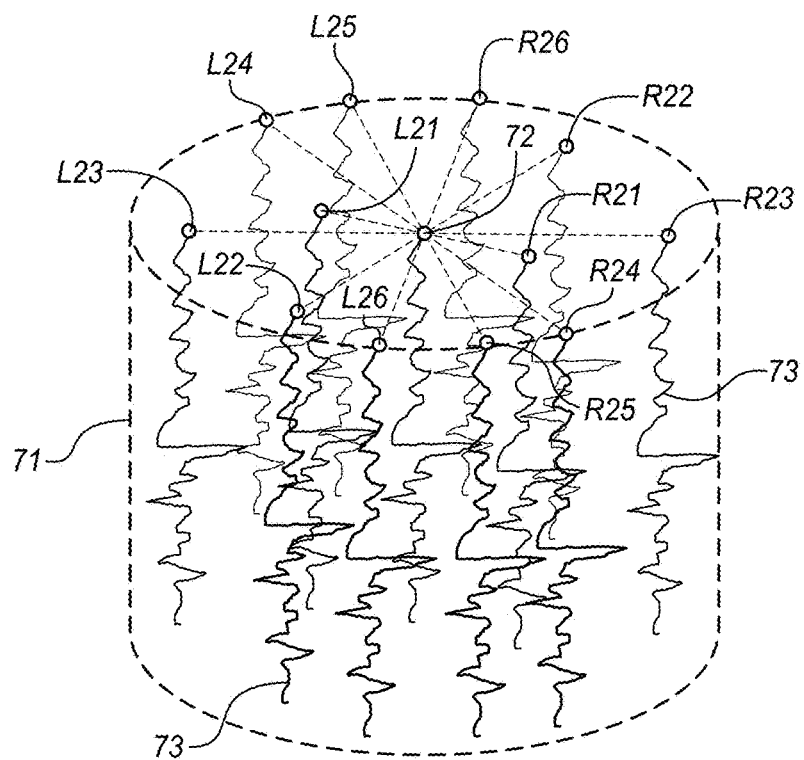
FIG. 7A is a perspective view diagram of a volume of seismic traces surrounding a central trace identified for rotational symmetry according to an embodiment of the invention.

As an alternative, the rotational symmetry may be determined. FIG. 7A is a perspective diagram view of a volume 71 that contains traces 73. The volume corresponds to a physical volume in a formation and the traces are traces that were measured in that formation. The top of the volume shown in a top elevation diagram view in FIG. 7B, may correspond to the surface of the ground in which the formation was measured or the entire sub volume may correspond to an underground area in an area of interest.

As in the example of FIG. 3, different symmetry measurements may be taken by moving the volume along the surface so that another trace is the central trace. Considering the example of FIG. 7B, the volume may be moved to the right one trace, so that the central trace is moved one trace to the right and the circular surface is shifted one trace to the right. New left and right matrices can be constructed with the new volume and a new rotational symmetry can be determined. This allows the entire area of the formation to be surveyed to find faults, polylines or other structures in the formation.

Figure 7B:
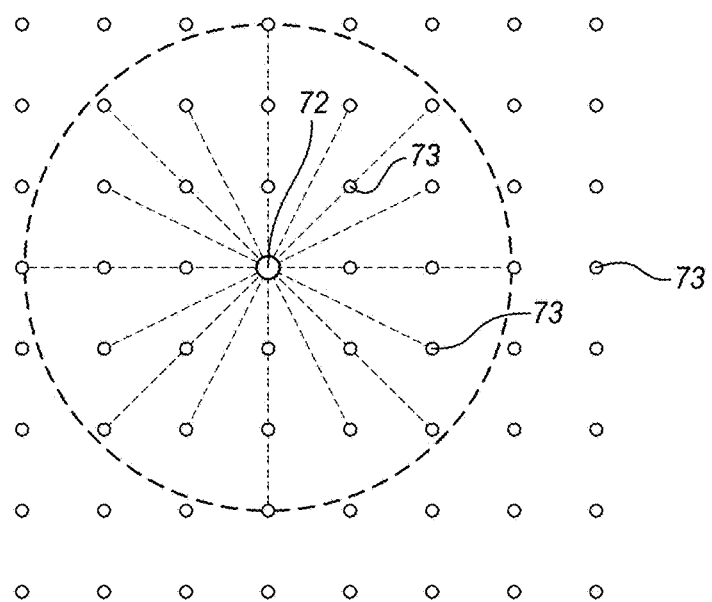
FIG. 7B is a top elevation view diagram of a volume of seismic traces surrounding a central trace identified for rotational symmetry according to an embodiment of the invention.

Referring to FIG. 7A, in a given neighborhood or a given sub volume, pairs of traces can be identified. The pairs may be selected as symmetrically located with respect to a selected center trace. In FIG. 7B, the center trace 72 is identified by a central dot 72. Pairs of traces are identified on opposing sides of the central dot. Accordingly, there are pairs of traces R21:L21, R22:L22, R23:L23, R24:L24, R25: L25, R26:L26. The traces in these R:L pairs are located approximately the same distance from the center trace, and on opposite sides of the center trace. They are also collinear through the center trace in that a straight line drawn from one trace of the pair to the other trace of the pair will pass through the center trace. This is a cross-line through the central trace. Using these pairs of traces, the measurement of symmetry in the 3D seismic sub volume is an evaluation of the rotational symmetry of the pairs of traces.

Figure 8:
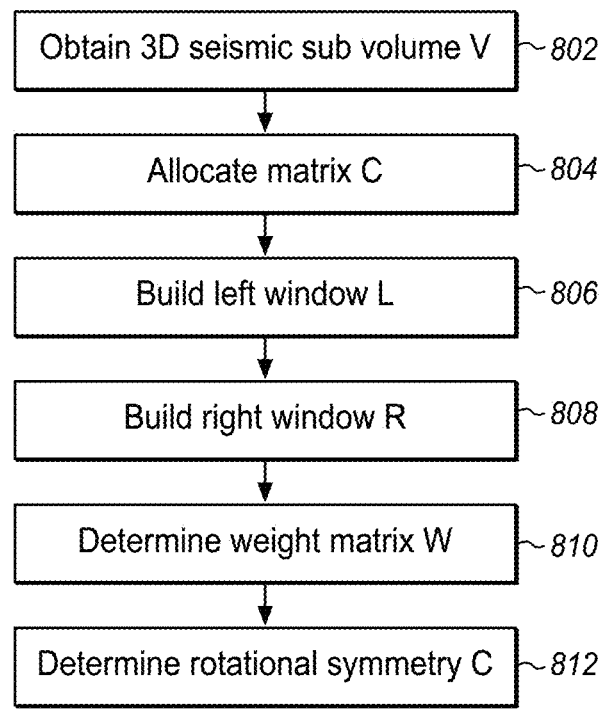
FIG. 8 is a process flow diagram of determining rotational symmetry about a central trace of a 3D seismic volume according to an embodiment of the invention.

FIG. 8 shows a generalized example of evaluating the rotational symmetry for a 3D seismic volume V. At 802 a 3D seismic sub volume in the form of a matrix V is selected for evaluation. At 804 a matrix C for the rotational symmetry is allocated with the same size as the matrix V for the volume. The matrix can be defined in terms of voxels p each with an index (i, j, k) in the volume matrix V. For each voxel the sub volume N can be defined as containing the left and right matrices L, R upon which the rotational symmetry will be determined.

Accordingly, at 806, having selected a central trace, the left window L, now a sub volume in three dimensions is built and at 808, the right window R is built. A weight matrix may be determined at 810 and applied to the R and L windows. At 812, the rotational symmetry is determined using the L and R matrices.

The processes of FIG. 8 may also be shown in pseudo code in one example. In this pseudo code example, the rotational symmetry C is determined as a 3D matrix for a matrix N that represents a 3D subvolume of the entire surveyed volume. The subvolume N may correspond, for example to the cylinder shown for example in FIG. 7A.

The process below also introduces a process for appending rows to the L and R matrices for which the symmetry is determined. In general if matrix L has n rows (n can be 0), then L.append(t) makes L have n+1 rows, while the vector t becomes the last row in L. The corresponding process may also be applied to matrix R.

Considered in more detail L is a matrix and the append operator can add a trace as the very last row in the matrix. For example, if L contains one row corresponding to one trace then that row might appear as follows: [1 2 3 2 1 0 −1 −2 −3]. With data for an additional trace t that might appear, for example, as follows: [−1 −4 −5 2 1 0 −2 −3 5]. The L.append(t) operation appends trace data t to the matrix L. L then will contain 2 rows as follows:

```
[1 2 3 2 1 0 -1 -2 -3;
-1 -4 -5 2 1 0 -2 -3 5]
Pseudo code example 3: General 3D Rotational Symmetry
1: procedure SYMMETRY3D
2:     C←Allocate matrix with same size as V
3:     for each voxel p in V with index (i, j, k) do
4:         N ←V.SubVolume(p)
5:         C(i, j, k) ←Rotational Symmetry 3D(N)
6:     end for
7:     return C
8: end procedure
9: procedure ROTATIONAL SYMMETRY3D(N)
10     L,R←Allocate two empty matrices
11:    for each trace t in N do
12:        if t is not in L and R then
13:            tr←N.counterTrace(t) t and tr are symmetric over
the center trace in N
14:            L.append(t)
15:            R.append(tr)
16:        else
17:            Continue
18:        end if
19:    end for
20:
```

$$W \leftarrow \left[\frac{3 - \text{sign}(L) * \text{sign}(R)}{2}\right]$$

21:

$$c \leftarrow \exp\left(\frac{\sum |L - R| \cdot W}{\sigma \sum |L| + |R|}\right)^2$$

```
22:    return c
23: end procedure
```

```
Pseudo code example 4: 3D Rotational Symmetry
1: procedure SYMMETRY3D(V,w)      V is seismic volume, w is vertical window size
2:     C←Allocate matrix with same size as V
3:     for each horizontal slice S with index i in V do
4:         for each pixel in S with index ( j,k) do
5:
```

$$C_L \leftarrow \begin{pmatrix} i & j+1 & k-1 \\ i & j & k-1 \\ i & j-1 & k-1 \\ i & j-1 & k \end{pmatrix} \text{Eq.}$$

6:

$$C_R \leftarrow \begin{pmatrix} i & j-1 & k+1 \\ i & j & k+1 \\ i & j+1 & k+1 \\ i & j+1 & k \end{pmatrix}$$

```
7:            L←GetTracesByCenterIndices(V,CL,w)
8:            R←GetTracesByCneterIndices(V,CR,w)
9:
```

$$W \leftarrow \left[\frac{3 - \text{sign}(L) * \text{sign}(R)}{2}\right]$$

10:

$$C(i, j, k) \leftarrow \exp\left(\frac{\sum |L - R| \cdot W}{\sigma \sum |L| + |R|}\right)^2$$

```
11:        end for
12:    end for
13:    return C
14: end procedure
15:    procedure GETTRACESBYCENTERINDICES(V,C,w)
16:        Allocate an empty matrix L
17:        for each row c in C do
18:            t←GetTrace(V,c,w)   Get a trace in V centered at c with window size w
19:            L.append(t)
20:        end for
21:        return L
22: end procedure
```

Figure 9A:
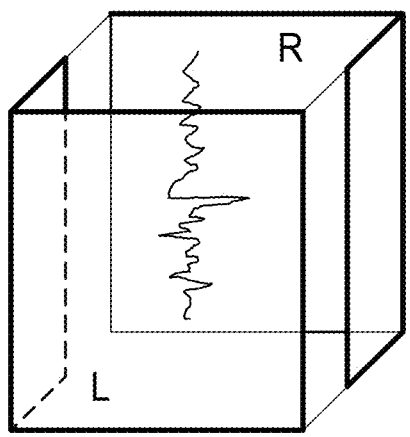
FIG. 9A is a perspective view diagram of a cubic volume of seismic traces surrounding a central trace identified for rotational symmetry according to an embodiment of the invention.
Figure 9B:
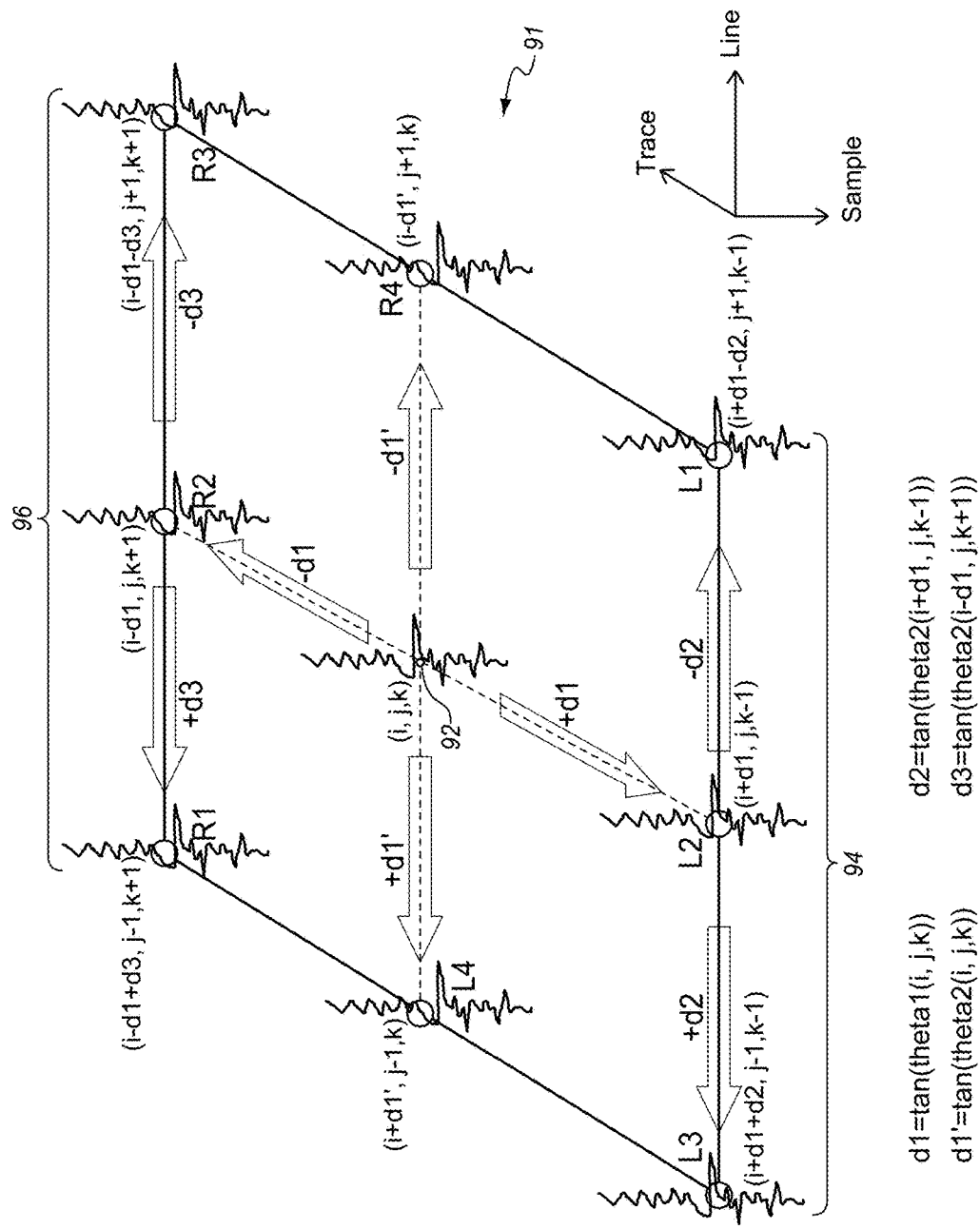
FIG. 9B is a central slice view diagram of the cubic volume of FIG. 9A according to an embodiment of the invention.

As with the 2D symmetry calculations, the accuracy of the symmetry evaluation may be improved by considering any dips in the seismic patterns. Pseudo code example 5 presents an example of determining 3D rotational symmetry considering dips in the volume. Here difference matrices are used to accommodate the dip. In this example, $D_1$ represents the indices difference of the current voxel (i,j,k) to its inline neighbors along the dip. $D_{1P}$ represents the indices difference of the current voxel (i,j,k) from its cross-line neighbors along the dip. $D_2$ represents the indices difference of the north voxel L2 as shown in FIG. 9B with index (i+$d_1$,j,k) from its inline neighbors along the dip. $D_3$ represents the indices difference of the south voxel R2 as shown in FIG. 9B with index (i−$d_1$,j,k) from its inline neighbors along the dip.

```
Pseudo code example 5 Dip-guided 3D Rotational Symmetry
1: procedure SYMMETRY3D(V, θ1, θ2,w)   V is the seismic volume,
θ1, is the inline and θ2 is the crossline apparent dip volume, w is the vertical window size
2:     C←Allocate matrix with same size as V
3:     for each horizontal slice S with index i in V do
4:         D1, D1P, D2, D3←Allocate matrices with same size as S
5:         for each pixel p in S with index ( j,k) do
6:             D1( j,k)← tanθ1(i, j,k)
7:             D1P( j,k)←tanθ2(i, j,k)
8:             D2( j,k)← tanθ2(i + d1, j, k − 1)
9:             D3( j,k)←tanθ2(i − d1, j, k + 1)
10:        end for
11:        Smooth D1, D1P, D2, D3
12:        for each pixel p in S with index ( j,k) do
               (d1,d1P,d2,d3)← D1,D1P,D2,D3( j,k)
```

14:
$$C_L \leftarrow \begin{pmatrix} i+d1-d2 & j+1 & k-1 \\ i+d1 & j & k-1 \\ i+d1+d2 & j-1 & k-1 \\ i+d1p & j-1 & k \end{pmatrix}$$

$$C_R \leftarrow \begin{pmatrix} i-d1+d3 & j+1 & k-1 \\ i-d1 & j & k-1 \\ i-d1-d3 & j-1 & k-1 \\ i-d1p & j-1 & k \end{pmatrix}$$

16:      L←GetTracesByCenterIndices(V,$C_L$,w)
         R←GetTracesByCenterIndices(V,$C_R$,w)

18      $W \leftarrow \left[ \dfrac{3 - \text{sign}(L) * \text{sign}(R)}{2} \right]$ 19:
$$C(i, j, k) \leftarrow \exp\left( \dfrac{\sum |L-R| \cdot W}{\sigma \sum |L| + |R|} \right)^2$$

20:          end for
21:     end for
22:     return C
23: end procedure

Figure 10:
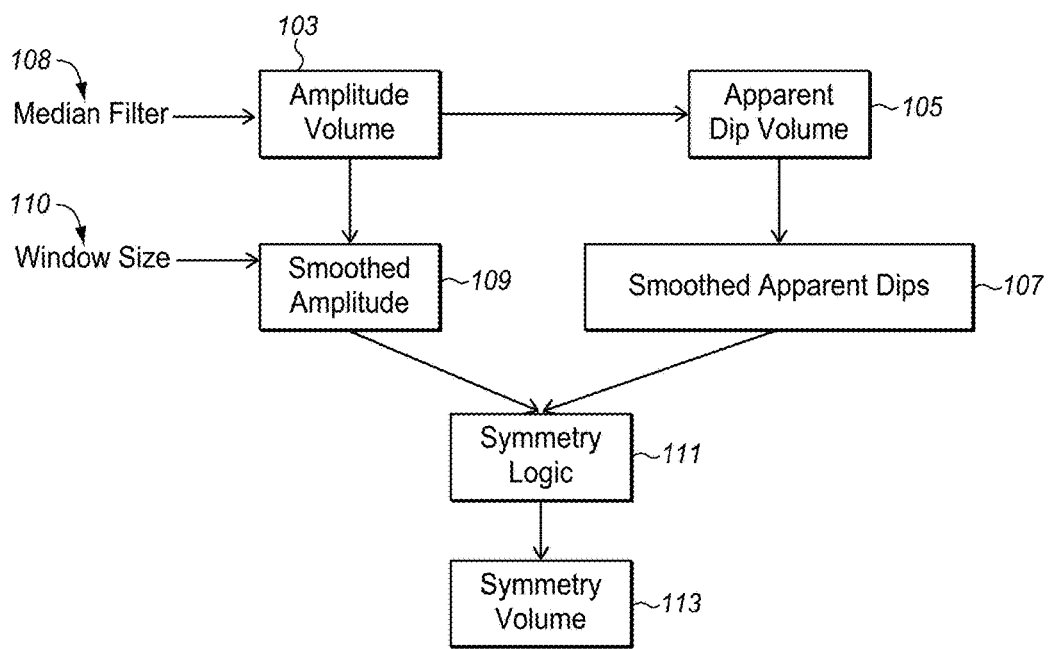
FIG. 10 is a functional block diagram of determining symmetry attributes of a seismic slice or volume according to an embodiment of the invention.

An example of a dip-guided rotational symmetry 3D workflow is shown in the process flow diagram of FIG. 10. The input 103 is a volume V of seismic amplitudes. Apparent Dip Volumes may be searched 105 within the amplitude samples, the resulting volumes may then be smoothed 107 for apparent dips. The smoothed input volume is then applied to symmetry logic 111.

A pre-conditioning operation 109 is also applied to the seismic amplitudes apart from the Apparent Dip Volume technology 105. The pre-conditioning smoothes the seismic data using for example a 3D median filter 108. This filtered data is also provided to the symmetry logic. The symmetry logic 111 provides a symmetry volume 113, such as the symmetry attribute C. This may then be applied to pick out stratigraphic features (not shown) as described above. As shown in FIG. 10, dips may first be generated 105 from the amplitude volume 103. The dips may then be used to guide a local symmetry calculation 111.

In some cases, a formation will not have many dips. In such a case, the adjustment for dips and the smoothing of dips may be avoided without a significant impact on the results. In some cases, a portion of a formation may have very few dips while another portion may have many dips. As an example, the upper part of a set of 3D volumes may contain rich geographic structures, such as channels and faults, while the lower part of the same volumes may contain few geographic structures and be fairly homogenous.

Compared to other attributes, such as similarity, and a smoothed dip of maximum similarity, a symmetry attribute may often cause channels, faults, polylines and other features to be more observable.

Figure 11:
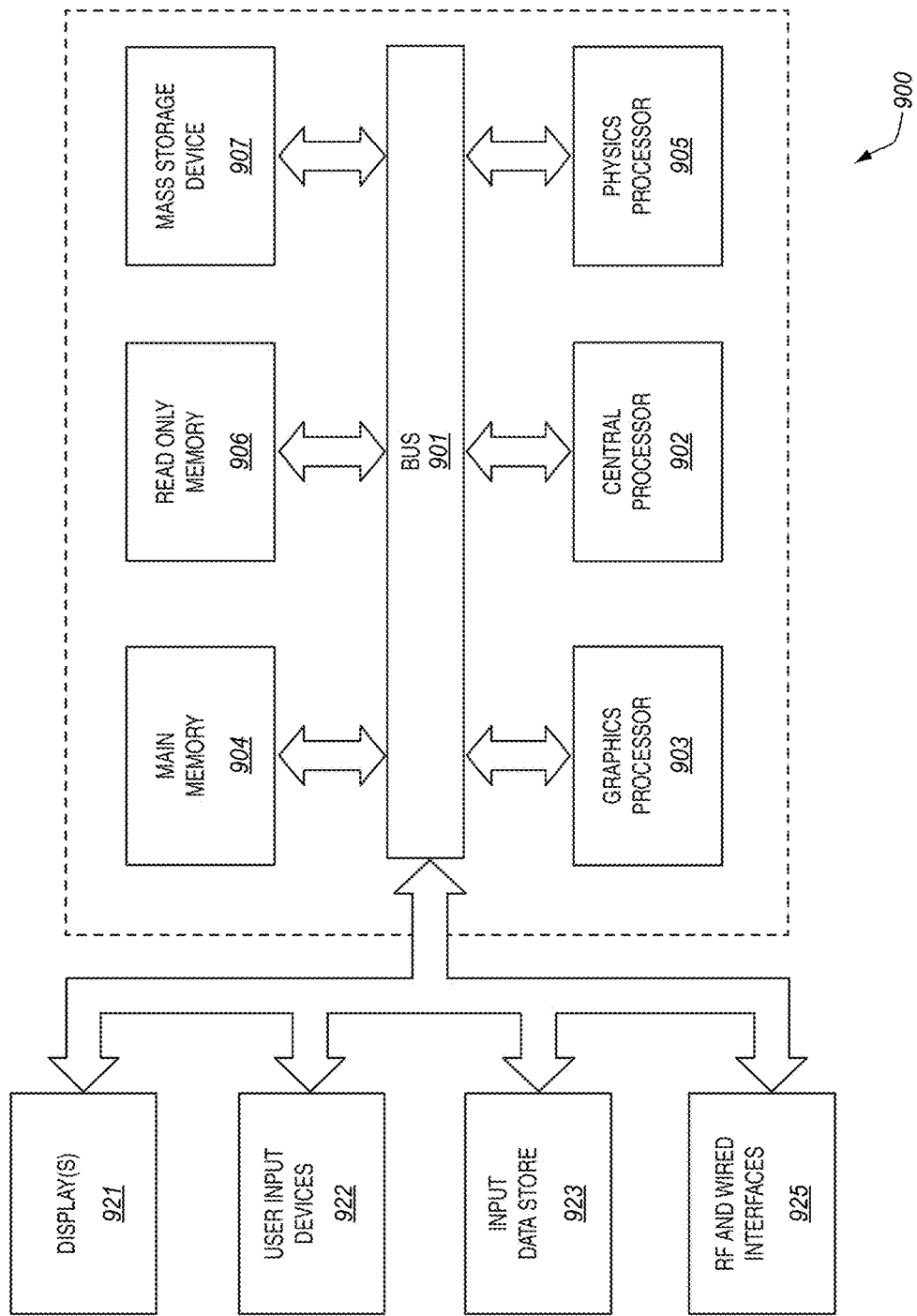
FIG. 11 is a block diagram of a computer system suitable for implementing processes of the present disclosure according to an embodiment of the invention.

FIG. 11 is a block diagram of a computing system suitable for use in evaluating input seismic data and finding attributes, faults, polylines and more as described above, such as a personal computer, workstation computer, minicomputer, main frame computer, server, etc.

The device computer system 900 includes a bus or other communication means 901 for communicating information, and a processing means such as one or more microprocessors 902 coupled with the bus 901 for processing information. The computer system may be augmented with a graphics processor 903 specifically for rendering graphics through parallel pipelines and a physics processor 905 for calculating; parallel physics operations. These processors may be incorporated into the central processor 902 or provided as one or more separate processors.

The computer system 900 further includes a main memory 904, such as a random access memory (RAM) or other dynamic data storage device, coupled to the bus 901 for storing information and instructions to be executed by the processor 902. The main memory also may be used for storing temporary variables or other intermediate information during execution of instructions by the processor. The computer system may also include a nonvolatile memory 906, such as a read only memory (ROM) or other static data storage device coupled to the bus for storing static information and instructions for the processor.

A mass memory 907 such as a magnetic disk, optical disc, or solid state array and its corresponding drive may also be coupled to the bus of the computer system for storing information and instructions. The computer system can also be coupled via the bus to a display device or monitor 921, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 921.

Input data stores 923 are coupled to the bus to provide input seismic data or intermediate values from other computer systems as mentioned above.

Communications interfaces 925 are also coupled to the bus 901. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, control surfaces or consoles, or servers via a conventional network infrastructure, including an Intranet or the Internet, for example.

A lesser or more equipped system than the example described above may be preferred for certain implementations. Therefore, the configuration of the example system 900 will vary from implementation to implementation depending upon numerous factors, such as price constraints, performance requirements, technological improvements, or other circumstances.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method of processing seismic input data obtained using one or more seismic sensors to generate higher resolution imaging of stratigraphic features contained within a portion of a subsurface, the data having a plurality of seismic traces, the method comprising:
    selecting a first center trace from among the plurality of traces;
    assigning a first cluster of the traces to a left image and a second cluster of the traces to a right image, the first cluster comprising one or more of the plurality of traces disposed to the left of the selected first center trace, and the second cluster comprising one or more of the plurality of traces disposed to the right of the selected first center trace; and
    calculating a symmetry value using one or more processors, the symmetry value representing a degree of symmetry, about the first center trace, between the left and the right images;
    selecting a second center trace from among the plurality of traces;
    shifting the first and second clusters of traces so that the first cluster comprises one or more of the plurality of traces disposed to the left of the selected second center trace, and the second cluster comprising one or more of the plurality of traces disposed to the right of the selected second center trace; and
    calculating a second symmetry value using the one or more processors, the symmetry value representing a degree of symmetry, about the second center trace, between the left and the right images; wherein the first and second symmetry values reveal one or more stratigraphic features of the portion of the subsurface to create higher resolution imaging of the one or more stratigraphic features within a seismic image of the subsurface.

2. The method of claim 1, wherein the seismic input data comprises a two-dimensional (2D) seismic slice S, having a plurality of pixels, each pixel corresponding to a sample of a trace, wherein each trace in the left image L has a counterpart trace in the right image R opposite the central trace and at about the same distance, and wherein calculating the symmetry value comprises:
    calculating reflectional symmetry with the left image L and the right image R, for each pixel p of S; and
    recording a resulting value as the reflectional symmetry value for each pixel p.

3. The method of claim 1, wherein the seismic input data comprises a three-dimensional (3D) volume V, having a plurality of voxels p, each voxel corresponding to a sample of a trace and wherein calculating the symmetry value comprises:
    calculating rotational symmetry with the left image L and the right image R, for each voxel p of V; and
    recording a resulting value as the rotational symmetry value for each voxel p.

4. The method of claim 3, wherein assigning a first portion of the traces comprises getting a neighborhood sub-volume N around p and assigning a first portion of the traces of the sub-volume N to the left image L and a second portion of the traces of the sub-volume N to the right image R.

5. The method of claim 4, wherein the neighborhood sub-volume N is a 3D cube with size of i×j×k, where i is the number of neighboring samples in each trace, j the number of neighboring traces along an inline direction, and k is the number of neighboring traces along a cross-line direction.

6. The method of claim 4, wherein getting a neighborhood sub-volume N comprises getting a 3D window.

7. The method of claim 6, wherein the neighborhood sub-volume N is based on a dip-guided 3D window with size of i×j×k, where I is the number of neighboring samples in each trace, j is the number of neighboring traces along an inline direction, and k is the number of neighboring traces along a cross-line direction and wherein the center of the 3D window on each neighboring trace is derived by the apparent dips of the voxel p.

8. The method of claim 7, wherein assigning to a left and a right image comprises:

dividing the traces in N into two clusters L and R, so that each trace tl in L has a counterpart trace tr in R, that are on opposite sides of the central trace tc and so that for voxel p in N, tl and tr have the same distance from the central trace tc; and sorting all the traces in L and R, so that each trace in L has the same indices as its counterpart trace in R, L and R being thereby two matrices containing the same number of rows, corresponding to traces and columns correspond to samples in a trace.

9. The method of claim 8, wherein calculating the rotational symmetry comprises calculating the rotational symmetry s for the voxel p with the neighborhood sub-volume N, by:

calculating the symmetry value s for the voxel p as:

$$s = \exp\left(\frac{\sum |L-R| \cdot W}{\sigma \sum |L| + |R|}\right)^2$$

wherein s is a degree of reflectional symmetry for each pixel of S, σ is an optional constant and W is an optional weighting factor.

10. The method of claim 1, further comprising preconditioning the seismic input data using a median filter before determining a center trace.

11. The method of claim 1, further comprising calculating and smoothing apparent dip volumes of the seismic input data along inline and cross-line directions before determining the symmetry.

12. The method of claim 1, further comprising picking geographic features from the seismic input data using the determined symmetry.

13. The method of claim 12, wherein the geographic features comprise at least one of faults, channels, and fractures.

14. A non-transitory machine-readable storage medium having instructions thereon that when operated on by the machine cause the machine to perform operations comprising:

selecting a center trace from among a plurality of seismic traces obtained using one or more seismic sensors to determine an attribute of a portion of a subsurface, the plurality of seismic sensors being in the form of a matrix having a plurality of pixels with each pixel corresponding to a sample of a trace;

assigning a first cluster of the traces to a left image and a second cluster of the traces to a right image, the first cluster comprising one or more of the plurality of traces disposed to the left of the selected center trace, and the second cluster comprising one or more of the plurality of traces disposed to the right of the selected center trace, each trace in the left image having a counterpart trace in the right image opposite the central trace and at about the same distance;

calculating a symmetry value with respect to the center trace between the left and the right images, the symmetry value representing a degree of symmetry, about the center trace, between the left image and the right image, wherein calculating the symmetry value includes calculating symmetry with the left image and the right image, for each pixel of the input seismic data by comparing the magnitude of the difference between the left image and the right image to the sum of the magnitude of the left image and the magnitude of the right image for each pixel; and recording a resulting value as the symmetry value for each pixel, wherein the symmetry value reveals one or more stratigraphic features of the portion of the subsurface to create higher resolution imaging of the one or more stratigraphic features within a seismic image of the subsurface.

15. The medium of claim 14, wherein the matrix corresponds to a neighborhood sub-volume N based on a dip-guided 3D window with size of i×j×k, where i is the number of neighboring samples in each trace, j is the number of neighboring traces along an inline direction, and k is the number of neighboring traces along a cross-line direction and wherein the center of the 3D window on each neighboring trace is derived by the apparent dips of a voxel p.

16. An apparatus comprising:

a data store to provide seismic input data obtained using one or more seismic sensors for which an attribute of a portion of a subsurface is to be determined, the data having a plurality of seismic traces corresponding to a formation;

a symmetry attribute determination module configured to:
select a first center trace from among the plurality of traces, assign a first cluster of the traces to a left image and a second cluster of the traces to a right image, the first cluster comprising one or more of the plurality of traces disposed to the left of the selected first center trace, and the second cluster comprising one or more of the plurality of traces disposed to the right of the selected first center trace, and calculate a first symmetry value using one or more processors, the first symmetry value representing a degree of symmetry, about the first center trace, between the left and the right images;

select a second center trace from among the plurality of traces;

shift the first and second clusters of traces so that the first cluster comprises one or more of the plurality of traces disposed to the left of the selected second center trace, and the second cluster comprising one or more of the plurality of traces disposed to the right of the selected second center trace; and calculate a second symmetry value using the one or more processors, the symmetry value representing a degree of symmetry, about the second center trace, between the left and the right images; wherein the first and second symmetry values reveal one or more stratigraphic features of the portion of the subsurface to create higher resolution imaging of the one or more stratigraphic features within a seismic image of the subsurface; and a fault picker configured to automatically pick faults in the formation using the calculated first and second symmetry values.

17. A method of processing seismic input data obtained using one or more seismic sensors to determine an attribute of a portion of a subsurface, the input data having a plurality of seismic traces and comprising a two-dimensional (2D) seismic slice (S) having a plurality of pixels, each pixel corresponding to a sample of a trace, the method comprising:

selecting a center trace from among the plurality of traces;
assigning a first cluster of the traces to a left image (L) and a second cluster of the traces to a right image (R), the first cluster comprising one or more of the plurality of traces disposed to the left of the selected center trace, and the second cluster comprising one or more of the plurality of traces disposed to the right of the selected center trace, wherein each trace in the left image L has a counterpart trace in the right image R opposite the central trace and at about the same distance, wherein L and R are 2D matrices; and calculating a symmetry value using one or more processors, the symmetry value representing a degree of symmetry, about the center trace, between the left and the right images, wherein calculating the symmetry value comprises calculating reflectional symmetry with the left image L and the right image R, for each pixel of S and recording a resulting value as the reflectional symmetry value for each pixel by comparing the magnitude of the difference between L and R to the sum of the magnitude of L and the magnitude of R for each pixel; wherein the symmetry value reveals one or more stratigraphic features of the portion of the subsurface to create higher resolution imaging of the one or more stratigraphic features within a seismic image of the subsurface.

18. The method of claim 17, wherein calculating the reflectional symmetry comprises applying $$s = \exp\left(\frac{\sum |L - R| \cdot W}{\sigma \sum |L| + |R|}\right)^2$$

wherein s is a degree of reflectional symmetry for each pixel of S, $\sigma$ is an optional constant and W is an optional weighting factor.

19. The method of claim 18, wherein the weighting factor W is determined based on the sign of the combined values of L and the combined values of R.

* * * * *